(12) United States Patent
Kurumai et al.

(10) Patent No.: US 9,223,896 B2
(45) Date of Patent: Dec. 29, 2015

(54) SCREEN GENERATION METHOD, AND SCREEN GENERATION APPARATUS

(75) Inventors: Noboru Kurumai, Kawasaki (JP); Takeo Yasukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 12/618,160

(22) Filed: Nov. 13, 2009

(65) Prior Publication Data
US 2011/0083083 A1    Apr. 7, 2011

(30) Foreign Application Priority Data

Feb. 10, 2009    (JP) .................................. 2009-29021

(51) Int. Cl.
*G06F 3/00* (2006.01)
*G06F 17/30* (2006.01)

(52) U.S. Cl.
CPC .............................. *G06F 17/30905* (2013.01)

(58) Field of Classification Search
USPC ........................................................ 715/744
See application file for complete search history.

(56) References Cited

U.S. PATENT DOCUMENTS

| | | | | |
|---|---|---|---|---|
| 5,768,614 | A * | 6/1998 | Takagi et al. ..................... | 710/1 |
| 5,999,179 | A * | 12/1999 | Kekic et al. ..................... | 715/734 |
| 6,263,346 | B1 * | 7/2001 | Rodriquez ..................... | 709/203 |
| 6,505,246 | B1 * | 1/2003 | Land et al. ..................... | 709/224 |
| 6,697,088 | B1 * | 2/2004 | Hollander ..................... | 715/744 |
| 2001/0052910 | A1 * | 12/2001 | Parekh et al. ................. | 345/744 |
| 2002/0065672 | A1 | 5/2002 | Shigeto | |
| 2002/0095459 | A1 * | 7/2002 | Laux et al. ..................... | 709/203 |
| 2002/0099456 | A1 * | 7/2002 | McLean ........................... | 700/83 |
| 2002/0129016 | A1 * | 9/2002 | Christfort et al. ............... | 707/6 |
| 2002/0196141 | A1 * | 12/2002 | Boone et al. ................... | 340/540 |
| 2003/0151621 | A1 * | 8/2003 | McEvilly et al. .............. | 345/744 |

(Continued)

FOREIGN PATENT DOCUMENTS

| | | |
|---|---|---|
| JP | 2002-163382 | 6/2002 |
| JP | 2003-44417 | 2/2003 |

(Continued)

OTHER PUBLICATIONS

B. Basham et al., "Doing a conditional include with <c:if>"; Head First Servlets with JSP, Second Edition; Mar. 25, 2008; p. 451; O'Reilly Media, Inc.; URL:http://mysafaribooksonline.com/web-development/jsp/9780596516680/9dot-using-jstl-custom-tags-are-powerful/451.

(Continued)

*Primary Examiner* — Stephen Alvesteffer
(74) *Attorney, Agent, or Firm* — Staas & Halsey LLP

(57) ABSTRACT

An apparatus, method and screen recording medium are provided. The apparatus includes a determining unit which determines, in response to a request to perform processing including a screen transition and the request is transmitted from a client device via a network, whether a screen definition data, as a transition destination, associated with a client identifier relating to the client device is stored in a screen definition data storage unit, and a generating unit which generates, when the screen definition data is stored, a data of the screen functioning as the transition destination by using the screen definition data and generates, when the screen definition data is not stored, a data of the screen functioning as the transition destination by using a common screen definition data.

9 Claims, 11 Drawing Sheets

(56) References Cited

U.S. PATENT DOCUMENTS

| | | | |
|---|---|---|---|
| 2004/0113944 | A1 | 6/2004 | Kawamura |
| 2005/0198324 | A1 | 9/2005 | Silva |
| 2007/0180396 | A1* | 8/2007 | Yajima et al. .................. 715/778 |
| 2007/0220484 | A1* | 9/2007 | Takahashi et al. ............ 717/109 |
| 2007/0236730 | A1 | 10/2007 | Takeuchi et al. |
| 2009/0006997 | A1* | 1/2009 | Jiang et al. .................... 715/771 |
| 2009/0106266 | A1* | 4/2009 | Donatelli et al. ............... 707/10 |
| 2010/0077359 | A1* | 3/2010 | Shinawaki .................... 715/846 |
| 2011/0010394 | A1* | 1/2011 | Carew et al. .................. 707/793 |

FOREIGN PATENT DOCUMENTS

| | | |
|---|---|---|
| JP | 2005-266946 | 9/2005 |
| JP | 2006-031666 | 2/2006 |
| JP | 2007-279974 | 10/2007 |
| JP | 2007-316904 | 12/2007 |

OTHER PUBLICATIONS

Lerner, R. M., "Javaserver Pages"; Linux Journal, Young, Westport, CT US,vol. 2001, No. 11, May 1, 2001, pp. 16, 18, 20-22; XP008015315.

European Search Report for corresponding European Application 09176681.6-2201; dated Dec. 14, 2010.

Japanese Notification of Reason(s) for Refusal dated Aug. 14, 2012 in Japanese Patent Application No. 2009-029021.

Japanese Office Action issued Jul. 23, 2013 in Japanese Patent Application No. 2009-029021.

European Office Action mailed Feb. 11, 2015 in related European Application No. 09176681.6.

* cited by examiner

| USER ID | TENANT ID |
|---------|-----------|
| user01  | AAA       |
| user02  | AAA       |
| user03  | BBB       |
| user04  | CCC       |
| ...     | ...       |

WEB-INF/jsp/a.jsp ~1711

```
<%@ page language = "java" contentType = "text/html;
charset = UTF-8" pageEncoding = "UTF-8"%>                                ~17110
<%@ taglib uri = "http://fx-saas.net/r3/tags-html" prefix="saas"%>
<saas:include/>~17120
```

FIG. 8A

WEB-INF/jsp/common/a.jsp — 1711

```
<%@ page language = "java" contentType = "text/html;
charset = UTF-8" pageEncoding = "UTF-8"%>
<div id = "title">
<div class = "back_r"></div>
<h2>ITEM FOR MEASUREMENT SEARCH-AND-LIST SCREEN</h2>    1715
</div>
<div class = "caption">
<div class = "back_r"></div>
<h3>SEARCH CONDITION</h3>
</div>
    ... REST IS OMITTED
```

FIG. 8B

WEB-INF/jsp/AAA/a.jsp — 1721

```
<%@ page language = "java" contentType = "text/html;
charset = UTF-8" pageEncoding = "UTF-8"%>
<div id = "title">
<div class = "back_r"></div>
<h1>ITEM FOR MEASUREMENT SEARCH-AND-LIST SCREEN</h1>    1725
</div>
<div class = "caption">
<div class = "back_r"></div>
<h3>SEARCH CONDITION</h3>
</div>
    ... REST IS OMITTED
```

FIG. 9

WEB-INF/jsp/a.jsp

```
<%@ page language = "java"contentType = "text/html; charset = UTF-8" pageEncoding = "UTF-8"%>   ~1711
<%@ taglib uri = "http://fx-saas.net/r3/tags-html" prefix="saas"%>   ~1712
<saas:include :defaultJsp = "default/":jsp = "aaaaaa.jsp";/>
                   ~1713                        ~1714
```

SCREEN GENERATION METHOD, AND SCREEN GENERATION APPARATUS

CROSS-REFERENCE TO RELATED APPLICATIONS

This application is related to and claims priority to Japanese Patent Application No. 2009-29021, filed on Feb. 10, 2009, and incorporated herein by reference.

BACKGROUND

1. Field

The embodiments discussed herein are directed to an image generation method and an image generation apparatus, and particularly to a method of generating a screen relating to a service provided via a network, and an apparatus configured to generate a screen.

2. Description of Related Art

Conventionally, Web applications provided by, for example, application service providers (ASPs) have been configured to satisfy user needs. Therefore, an ASP company has customized a single application for each of users, and has managed and operated the applications separately. The above-described user denotes an organization which makes a service utilization contract with the ASP including a corporation, a group, a public office, and so forth.

On the other hand, a system referred to as a Software as a Service (SaaS) can reduce a running cost by operating the same Web application on the same server and making a plurality of users use the same Web application (see Japanese Laid-open Patent Publication No. 2002-163382, for example).

At that time, if the ASP company simply prepares data used to construct a plurality of screens for each user, so as to provide the each user with a uniquely customized screen, the amount of data for management increases so that the merit of the SaaS is diminished.

SUMMARY

It is an aspect of the embodiments discussed herein to provide a method, a recording medium, and an apparatus, the apparatus including a determining unit which determines, in response to a request to perform processing including a screen transition and the request is transmitted from a client device via a network, whether a screen definition data, as a transition destination, associated with a client identifier relating to the client device is stored in a screen definition data storage unit, and a generating unit which generates, when the screen definition data is stored, a data of the screen functioning as the transition destination by using the screen definition data and generates, when the screen definition data is not stored, a data of the screen functioning as the transition destination by using a common screen definition data.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 7 illustrates an exemplary definition of include file data;

FIGS. 8A and 8B illustrate exemplary definitions of screen definition file data items;

FIG. 9 illustrates a second definition of the include file data;

DETAILED DESCRIPTION OF THE EMBODIMENTS

Figure 1:
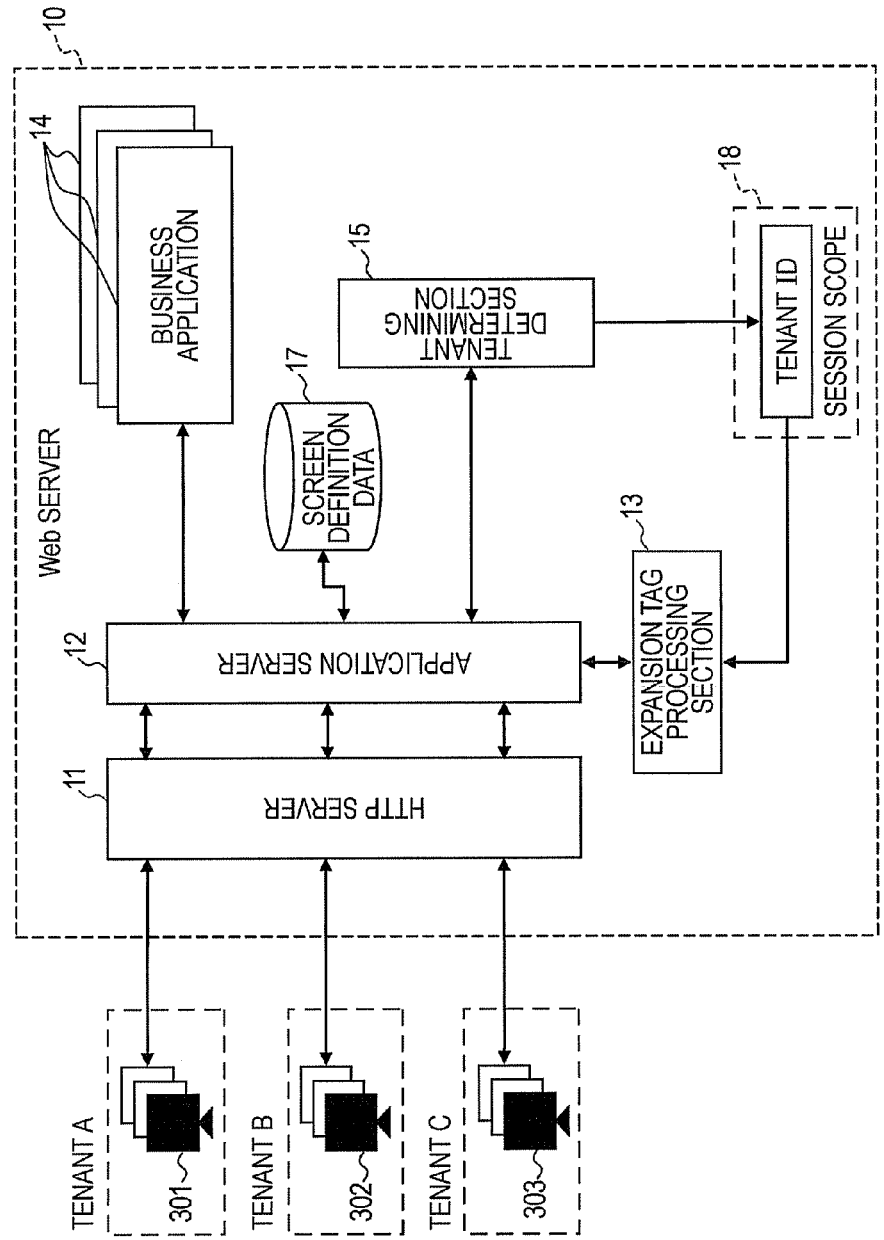
FIG. 1 illustrates an exemplary configuration of a system according to an embodiment.

FIG. 1 illustrates an exemplary configuration of a system according to an embodiment. In FIG. 1, client devices 301, 302, and 303, and a Web server 10 are connected to one another via a network including, for example, the Internet.

The Web server 10 is an example of a computer (screen generation apparatus) executing a screen generation method. The Web server 10 provides a user with a service including screen transitions via the network. The Web server 10 provides a tenant (described later) with a service achieved through the functions of application software (hereinafter simply referred to as an "application" for purposes of description) via the Internet. Software as a Service (SaaS) can be used as an exemplary system configured to provide the services through the Web server 10. Here, the Web server 10 is managed by the service provider.

Each of the client devices 301, 302, 303, and so forth (hereinafter collectively referred to as a "client device 30") may be computer which belongs to the service user's part. The client devices 301, 302, and 303 belong to the individual tenants A, B, and C. In the above-described embodiment, the term "tenant" denotes an organization including a corporation, a group, and so forth, which makes a service utilization contract with the service provider. Therefore, the term "tenant" may denote a set of at least one user.

The Web server 10 has software programs including a HyperText Transfer Protocol (HTTP) server 11, an application server 12, an expansion tag processing section 13, a business application 14, a tenant determining section 15, a screen definition data 17, and so forth.

The HTTP server 11 controls communications performed between the HTTP server 11 and the client device 30. For example, the HTTP server 11 receives request data (HTTP request data) transmitted from the client device 30, and transmits response data (HTTP response data) in response to the above-described request data in return.

The application server 12 starts (calls) the business application 14 related to the request data transmitted from the client device 30 (related to a Uniform Resource Locator (URL)). The application server 12 generates screen data (Hypertext Markup Language (HTML) data) which is to be transmitted to the client device 30 in return based on the result of processing performed by the business application 14. The screen data is generated based on the screen definition data 17. According to the above-described embodiment, Java (registered trademark) Server Pages (JSP) data is used as the screen definition data 17. Consequently, the application server 12 includes JSP container data which is an environment where the JSP data is executed.

The expansion tag processing unit 13 executes the processing corresponding to expansion tag data described in the screen definition data 17. Namely, the screen definition data 17 includes expansion tag data originally defined.

The business application 14 may be a Web application. A plurality of the Web applications may be provided with reference to the functions. The business applications 14 may be e shared among at least two tenants.

The tenant determining section 15 determines a tenant to which the client device 30 (user) functioning as the transmission source of the HTTP request belongs based on information included in the HTTP request received by the HTTP server 11. The tenant determining unit 15 adds (registers) identification information of the tenant corresponding to the determining result (hereinafter referred to as "tenant ID data") to session scope data 18. The term "session scope data" denotes data generated in a memory 103 so as to manage a session (and/or session information) established between the client device 30 and the Web server 10, and is usually referred to as a session object, for example. The tenant ID data is uniquely assigned to each tenant. The tenant ID data added to the session scope data 18 is referred to when the application server 12 generates screen data customized for each tenant through the expansion tag processing section 13. Further, the session scope data 18 may be s used as an identifier storage section used to retain the tenant ID data in association with the client device 30. However, if the association with the client device 30 can be kept over a time period where the session is established, different data (storage area) may be used as the identifier storage section. Further, it may be arranged that the tenant ID data is used as cookie information as is the case with session ID data and transmitted from the client device 30 each time the HTTP request data is issued.

Figure 2:
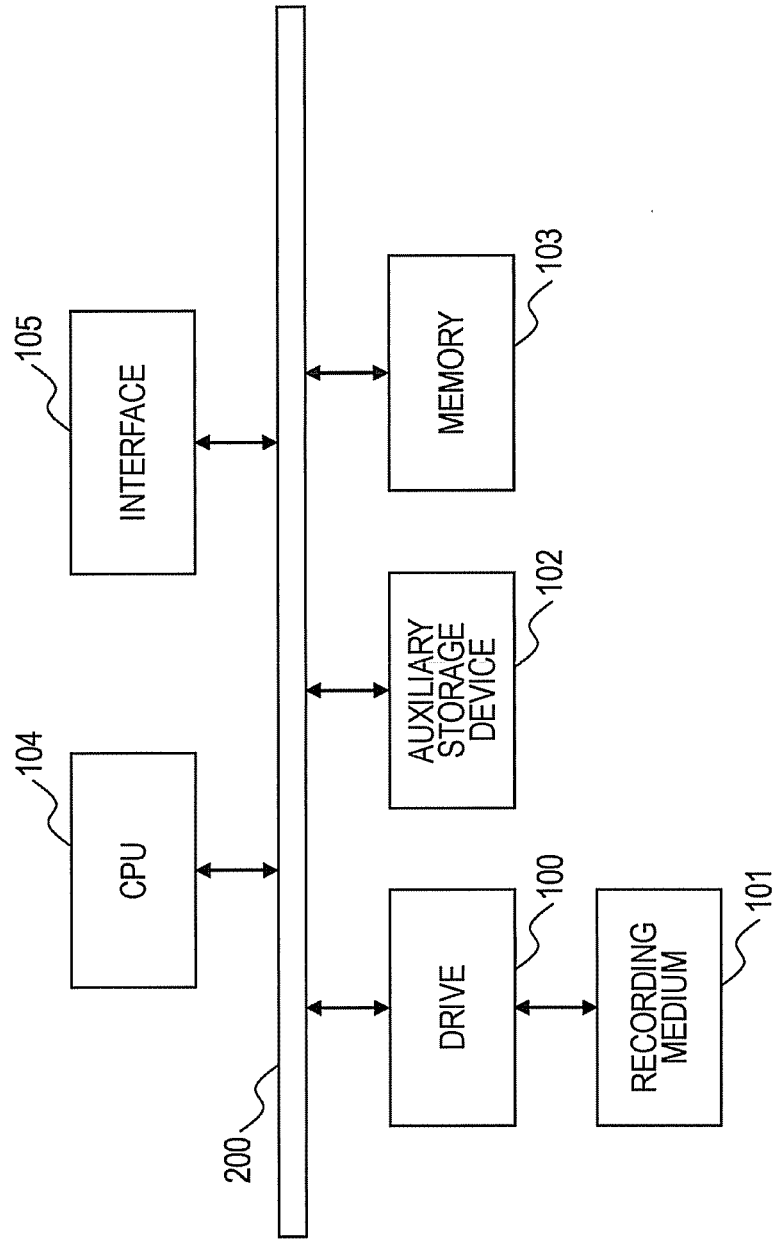
FIG. 2 illustrates an exemplary hardware configuration of a Web server according to an embodiment.

FIG. 2 illustrates an exemplary hardware configuration of the Web server 10 according to the above-described embodiment. The Web server 10 illustrated in FIG. 2 includes a drive 100, an auxiliary storage device 102, the memory 103, a central processing unit (CPU) 104, and an interface 105 that are connected to one another via a bus 200.

A program achieving processing performed through the Web server 10 is presented by a computer readable recording medium 101 including, for example, a compact disk (CD)-read only memory (ROM). When the recording medium 101 storing the program is set to the drive 100, the program is installed from the recording medium 101 into the auxiliary storage device 102 via the drive 100. However, the program is not necessarily installed from the recording medium 101 into the auxiliary storage device 102. Namely, the program may be downloaded from a different computer via the network. The auxiliary storage device 102 stores the installed program and appropriate file data and/or data (e.g., the screen definition data 17), for example.

When an instruction to start the program is issued, the program read from the auxiliary storage device 102 is stored in the memory 103. The CPU 104 executes a function relating to the Web server 10 based on programs stored in the memory device 103. The interface 105 is used as an interface for connection to the network.

Exemplary processing procedures performed by the web server 10 are e described with reference to FIG. 3.

When the HTTP server 11 receives the HTTP request transmitted from the client device 301 at operation S101, the tenant determining section 15 determines whether the tenant ID data is registered with the session scope data 18 corresponding to a session with the client device 301 at operation S102.

Each session is identified based on session ID data. The assignment of the session ID data is performed through the application server 12 when the session is established, and the session ID data is transmitted to the client device 301. The client device 301 retains the session ID data in cookies, for example, and transmits the session ID data to the Web server 10 each time the HTTP request is issued. Further, the session scope data 18 is generated through the application server 12 as well as the session ID data when the session is established, and managed in association with the session ID data. Therefore, the tenant determining section 15 can acquire the session scope data 18 corresponding to the currently performed session based on the session ID data.

If the tenant ID data is not registered with the session scope data 18 in the above-described embodiment, the transmitted HTTP request data is data of a log-in request. The log-in request data includes data of a user ID (ID provided to identify each user) and password data that are transmitted for a log-in screen displayed on a Web browser of the client device 30. Therefore, in that case (when the answer is No at operation S102), the tenant determining section 15 determines the tenant ID data corresponding to the user ID data included in the HTTP request data (log-in request data) based on tenant ID management table data at operation S103.

Figures 4, 5:
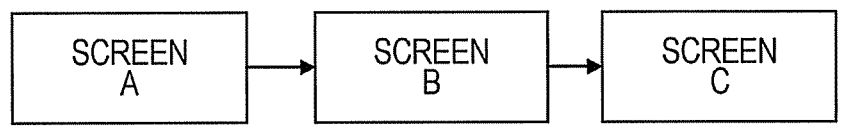
FIG. 4 illustrates an exemplary configuration of tenant ID management-table data.
FIG. 5 illustrates exemplary screen transitions according to the above-described embodiment.

FIG. 4 illustrates an exemplary configuration of tenant ID management table data 16. As illustrated in FIG. 4, information about correspondence between the user ID data and the tenant ID data is registered with the tenant ID management table data 16. For example, the user ID data included in the log-in request data denotes "user01", the tenant determining section 15 determines that the tenant ID data corresponding to the user ID data denotes "AAA".

The tenant determining section 15 registers the tenant ID data which is the determination result with the session scope data 18 at operation S104.

If each of the users of the tenant is notified of the tenant ID data, it may be arranged that the user transmits the tenant ID data at login time. In that case, the HTTP request data transmitted from the client device 30 includes the tenant ID data. Therefore, the tenant ID data included in the HTTP request may be registered with the session scope data 18 as it is.

In the above-described embodiment, however, the tenant ID data is automatically determined through the Web server 10 based on the user ID data. Consequently, each of the users of the tenant may not be informed of the tenant ID data. Further, each of the users may not store the tenant ID data and/or transmit the tenant ID data at login time so that the work load for the user is reduced.

On the other hand, when the tenant ID data had already been registered with the session scope data (namely, when the HTTP request data is data of a request to execute a business logic other than the log-in request) (when the answer is Yes at operation S102), the processing corresponding to operations S103 and S104 is not performed.

The application server 12 determines the business application 14 corresponding to the details of the HTTP request (for example, URL data included in the HTTP request data), and calls (and/or starts) the business application 14 at operation S105. The determination made by the business application 14, which corresponds to the details of the HTTP request, may be performed based on, for example, information about correspondence between the URL data and the business application 14, the correspondence information being stored in the auxiliary storage device 102.

The called business application 14 executes a business logic installed therein at operation S106. When the execution of the business logic is finished, the business application 14 requests the application server 12 to generate the screen data corresponding to the execution result. When issuing the screen-data generation request, the business application 14 specifies the name of JSP file data used to generate the screen data and stores data of the specified name in the application server 12.

The application server 12 generates screen data (HTML data) based on the JSP file specified by the business application 14 at operation S107. The application server 12 transmits the generated screen data to the HTTP server 11. The HTTP server 11 adds the screen data generated through the business application 14 to the HTTP response data, and transmits the HTTP response data to the client device 301 at operation S108.

Figure 3:
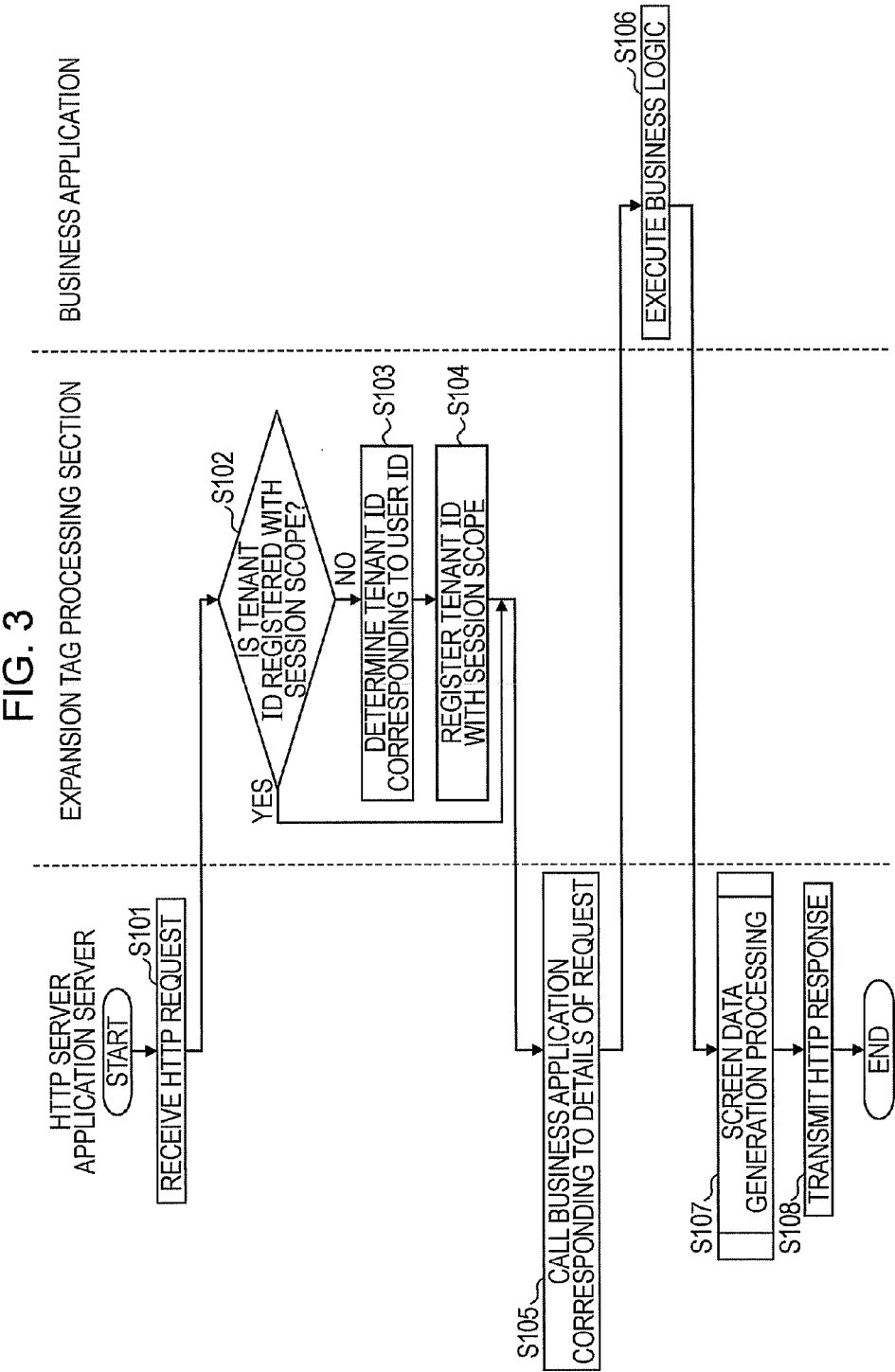
FIG. 3 is a flowchart showing processing procedures performed by the web server.

Processing illustrated in FIG. 3 is repeatedly executed so that a screen presented from the Web server 10 to the client device 301 (namely, a screen displayed on the client device 301) is caused to transition as illustrated in FIG. 5.

FIG. 5 illustrates exemplary screen transitions performed according to the above-described embodiment. In FIG. 5, the screen transitions are made in the order of a screen A, a screen B, and a screen C. Namely, when the processing illustrated in FIG. 3 is performed once, the screen A is displayed on the client device 301. If data of an operation instruction is transmitted through the screen A, the processing illustrated in FIG. 3 is performed again based on the operation instruction data. As a result, the screen B is displayed on the client device 301. When operation instruction data is transmitted through the screen B, the processing illustrated in FIG. 3 is performed again based on the operation instruction data. As a result, the screen C is displayed on the client device 301.

Although the client device 301 is exemplarily described in FIGS. 3 and 5, the same processing procedures and the same screen transitions are performed in the case where each of the client device 302 and client device 303 is used. In the above-described embodiment, however, at least one of the screens A, B, and C is customized and each tenant for displayed. For displaying a unique screen for each tenant, the screen definition data 17 according to the above-described embodiment has a configuration illustrated in FIG. 6, for example.

Figure 6:
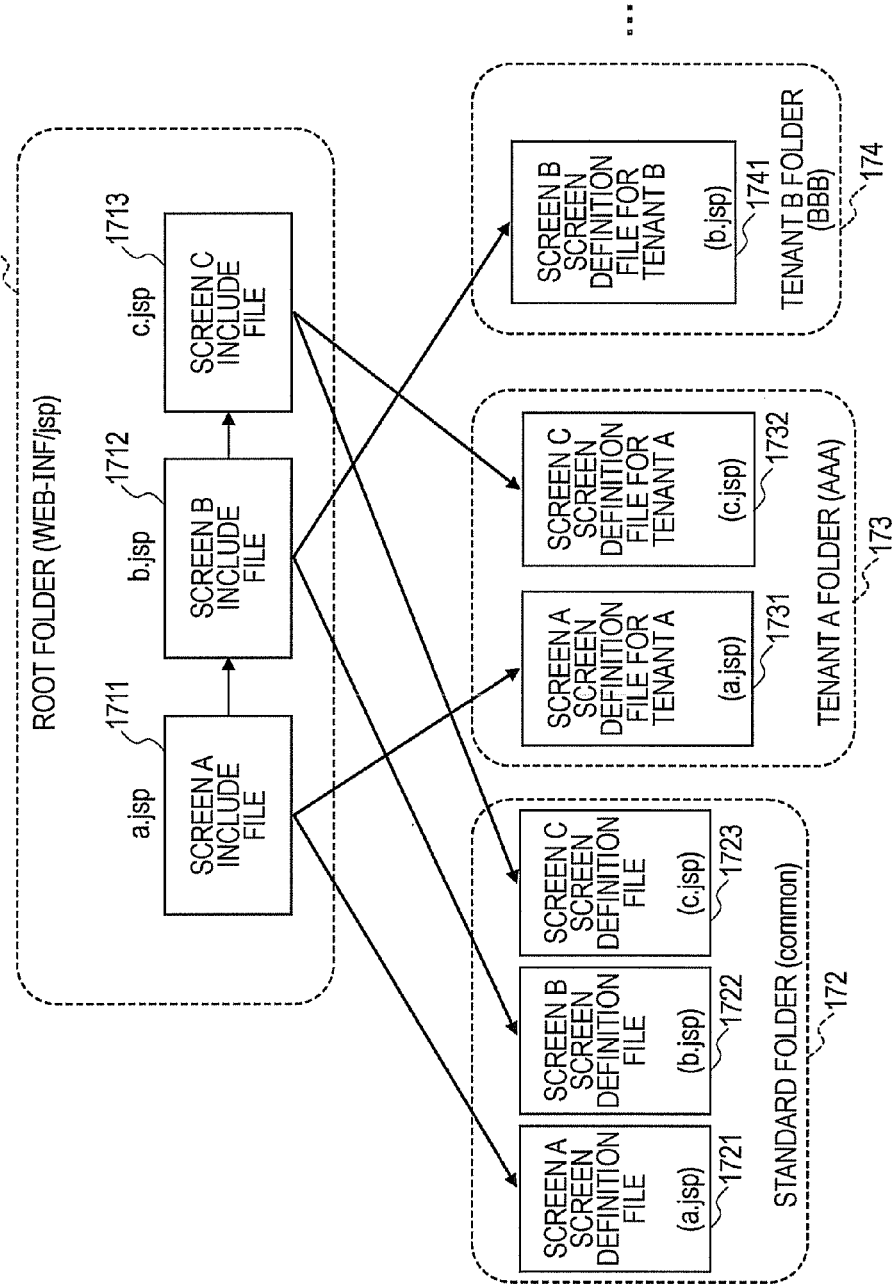
FIG. 6 illustrates an exemplary configuration of screen definition data according to the above-described embodiment.

FIG. 6 illustrates an exemplary configuration of the screen definition data according to the above-described embodiment. In the above-described embodiment, the screen definition data 17 is a set of JSP file data items. The JSP file data items are divided and stored in folders based on the functions, rolls, and positions thereof. In FIG. 6, a root folder 171, a standard folder 172, a tenant-A folder 173, and a tenant-B folder 174 are illustrated as folders provided to store the JSP file data items.

The root folder 171 is a root (the most significant) folder of a folder provided to store the screen definition data 17. The root folder 171 stores the JSP file data item functioning as include file data. In the above-described embodiment, the include file data denotes JSP file data in which definition (expansion tag) data used to call the expansion tag processing section 13 is described. The expansion tag processing section 13 selects screen definition file data used to generate the screen data from among the standard folder 172 and/or folders provided for the tenants (the tenant-A folder 173 and/or the tenant-B folder 174). Therefore, the include file data may be interpreted as JSP file data defined for selecting screen definition file data for use based on the tenant ID data. In FIG. 6, each of arrows extending from the include file data items to the screen definition file data items denotes the above-described selection relationship.

The include file data is generated for a series of screens displayed during the screen transitions. Therefore, FIG. 6 illustrates the include file data 1711 corresponding to the screen A, the include file data 1712 corresponding to the screen B, and the include file data 1713 corresponding to the screen C. Further, in FIG. 6, the path name of the root folder is determined to be "WEB-INF/jsp". Further, the names of the include file data items are individually determined to be a.jsp, b.jsp, and c.jsp.

Although FIG. 7 illustrates an exemplary definition of the include file data 1711, the details of the definition of each of the include file data 1712 and the include file data 1713 may be equivalent to those of the definition of the include file data 1711.

In FIG. 7, SaaS: include tag data 17120 is an example of expansion tag data used in the above-described embodiment. Namely, the SaaS: include tag data 17120 corresponds to a definition given to call the expansion tag processing section 13.

Description data 17110 denotes the definition of a JSP standard and indicates a location where a definition which makes it possible to process the SaaS: include tag data 17120 is given. Namely, file data identified by data of the URL "http://fx-saas.net/r3/tags-html", the URL data being included in the description data 17110, includes information about correspondence between the SaaS: include tag data 17120 and the expansion tag processing section 13. In the above-described embodiment, the expansion tag processing section 13 is implemented as a class of Java (registered trademark). Therefore, more specific details of the correspondence information denote a definition of correspondence between the SaaS: include tag data and the class name of the expansion tag processing section 13.

Returning to FIG. 6, the standard folder 172 is provided to store the JSP file data (screen definition file data) including the definition information (screen definition data) used to generate a screen provided as standard (default) through the Web server 10. The standard folder 172 stores standard screen definition file data for each series of screen images relating to the screen transitions. FIG. 6 illustrates the screen definition file data 1721 corresponding to the screen A, the screen definition file data 1722 corresponding to the screen B, and the screen definition file data 172c corresponding to the screen C. Further, in the above-described embodiment, the standard folder 172 is generated under the folder name "common" immediately under the root folder 171. Therefore, the path name of the standard folder is determined to be "WEB-INF/jsp/common". Further, the names of the screen definition file data items that are included in the standard folder 172 are individually determined to be a.jsp, b.jsp, and c.jsp. Namely, in the above-described embodiment, the names of the screen definition file data items agree with the names of the corresponding include file data items. The file names of the screen definition file data items 1721, 1722, and 172c are individually determined to be "a.jsp", "b.jsp", and "c.jsp".

The tenant-A folder 173 and the tenant-B folder 174 store screen definition file data items that are uniquely customized for the individual tenants A and B. However, each of the tenant folders does not necessarily store screen definition file data for every screen, but only stores screen definition file data for a screen which should be customized. For example, the tenant-A folder 173 stores screen definition file data 1731 provided for the screen A and screen definition file data 1732 provided for the screen C. Further, the tenant-B folder 174 only stores screen definition file 1741 provided for the screen B.

In the above-described embodiment, each of the tenant-A folder 173 and the tenant-B folder 174 is generated immediately under the root folder by using the tenant ID data of each tenant as the folder name. Therefore, the path name of the tenant-A folder 173 is determined to be "WEB-INF/jsp/AAA". Further, the path name of the tenant-B folder 174 is determined to be "WEB-INF/jsp/BBB". Further, the name of the screen definition file data stored in each tenant folder agrees with the name of the corresponding include file data. The name of the screen definition file data 1731 is "a. jsp". The name of the screen definition file data 1732 is "c. jsp". The name of the screen definition file data 1741 is "b. jsp".

FIGS. 8A and 8B illustrate exemplary definitions of screen definition file data items. FIG. 8A illustrates an exemplary definition of standard screen definition file data 1711. FIG. 8B illustrates screen definition file data 1721 provided for a tenant A. Since the specific details of the definition are determined based on the specifications of a standard JSP, the description thereof will be omitted. Here, the difference between the two screen definition file data items (descriptions 1715 and 1725 that are surrounded by broken lines as illustrated in FIGS. 8A and 8B will be described. According to the description 1715, the character string "item for measurement search-and-list screen" is surrounded by a tag <h2>. On the other hand, according to the description 1725, the same character string is surrounded by a tag <h1>. Namely, on the screen A provided for the tenant A, the size of the character string "item for measurement search-and-list screen" is changed.

The standard folder name is determined to be "common", and the name of each of the screen definition file data items agrees with the name of the corresponding include file data. Namely, each of the file data names is uniquely determined. For giving flexibility to the names of the standard folder and/or the screen definition file data, the include file data may be defined as illustrated in FIG. 9.

FIG. 9 illustrates a second definition of the include file data. In FIG. 9, the same parts as those illustrated in FIG. 7 are designated by the same reference numerals, and the descriptions thereof will be omitted as appropriate.

In FIG. 9, SaaS: include tag data includes defaultJsp attribute data 1713 and jsp attribute data 1714. The value of the defaultJsp attribute data 1713 indicates the name of the standard folder 172 (namely, information provided to identify the standard folder 172). The value of the jsp attribute data 1714 indicates the name of the screen definition file data corresponding to the above-described include file data (namely, information provided to identify the screen definition file data).

Therefore, according to the exemplary definition illustrated in FIG. 9, the path name of the standard screen definition file data of the screen A is determined to be "WEB-INF/jsp/default/aaaaaa.jsp". Further, the path name of the screen definition file data used for the tenant A of the screen A is determined to be "WEB-INF/jsp/AAA/aaaaaa. jsp".

By making the names of the standard folder 172 and the screen definition file data changeable, flexibility can be given to the configuration of the standard folder 172 and/or that of the screen definition file data. Further, each of the defaultJsp attribute and the jsp attribute can be defined for each include file data, that is, each screen. Therefore, it becomes possible to change the path name of the standard folder 171 and/or the name of the screen definition file data for each screen.

Figure 10:
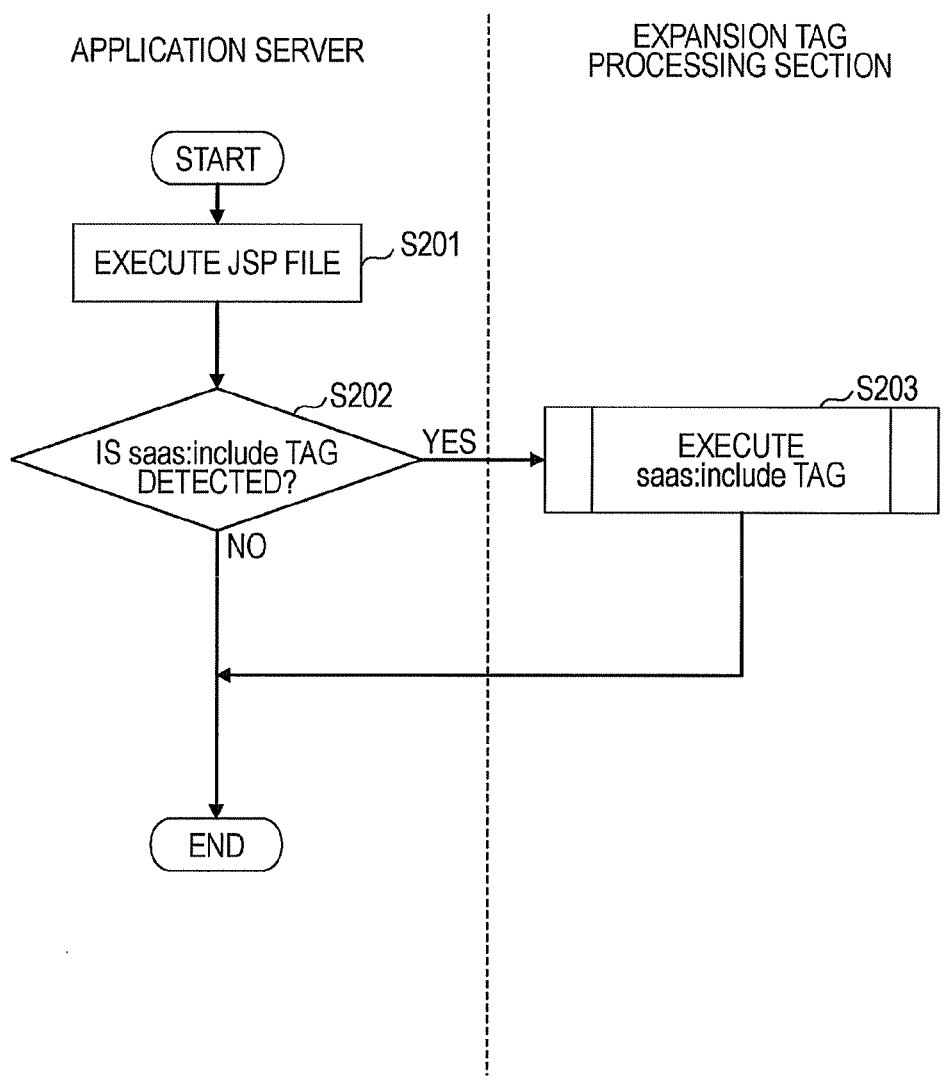
FIG. 10 illustrates performing screen data generation processing.

Assuming that the screen definition data 17 is configured as illustrated in FIGS. 5 to 9, the details of operation S107 illustrated in FIG. 3 will be described. FIG. 10 is a flowchart showing the procedure for performing screen data generation processing.

At operation S201, the application server 12 acquires JSP file data specified by the business application 14, and executes the JSP file data. Here, the JSP file data for execution corresponds to the include file data. For example, if the screen A is a screen which is the transition destination, the business application 14 specifies the file name of the screen A (a. jsp). The application server 12 acquires JSP file data relating to the file name (that is, the include file data) from the root folder 171, and executes the JSP file data.

When the application server 12 detects the SaaS: include tag data while executing the include file data on a line-by-line basis (when the answer is Yes at operation S202), the application server 12 calls the expansion tag processing section 13. Calling the expansion tag processing section 13 in response to the detection of the SaaS: include tag data is determined based on, for example, the description data 17110 illustrated in FIG. 7.

The expansion tag processing section 13 responds to the call, and executes processing implemented therein at operation S203. After the processing performed by the expansion tag processing section 13 is finished, the screen data generation processing is finished.

Figure 11:
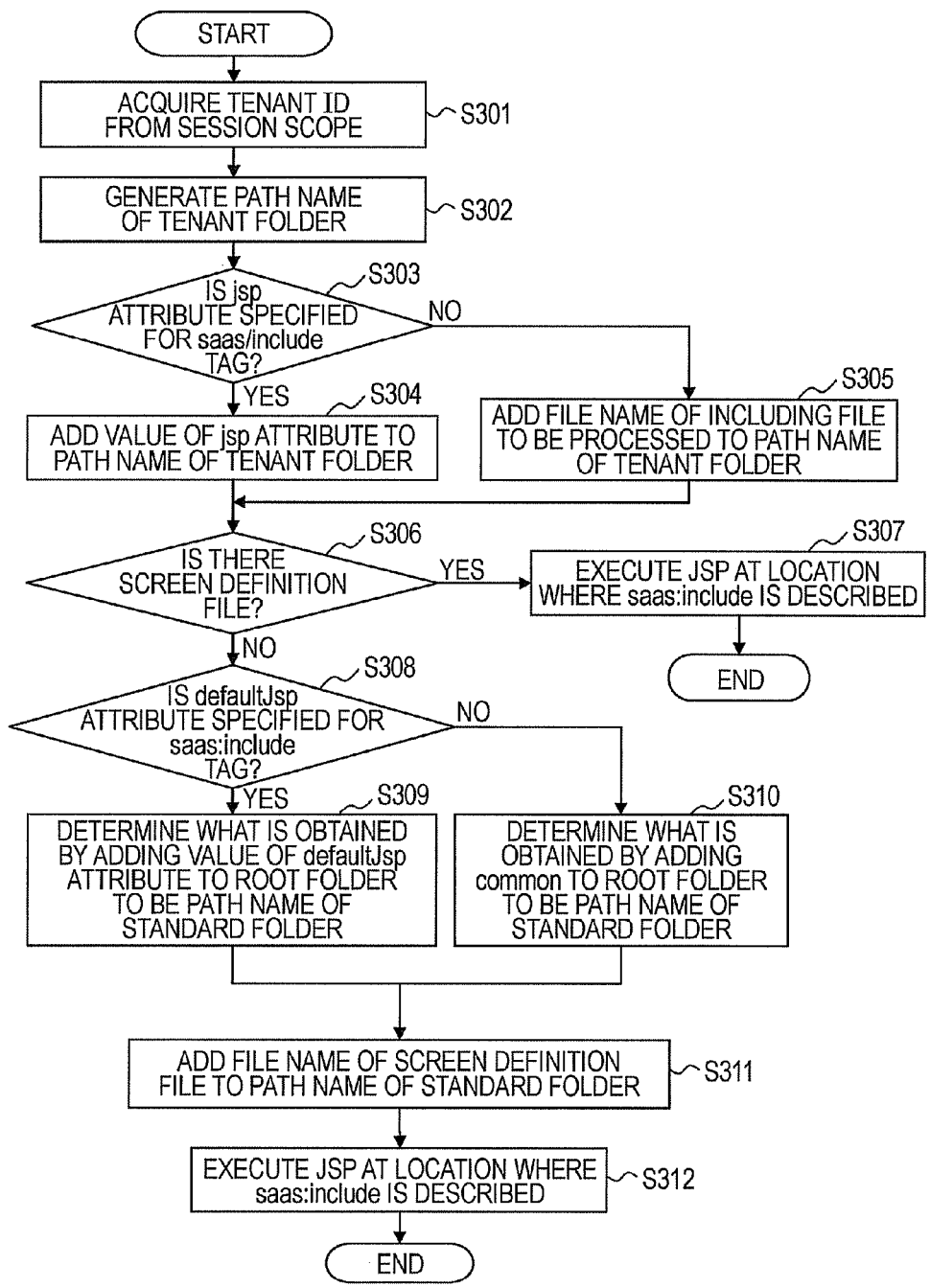
FIG. 11 illustrates processing procedures performed by an expansion tag processing section.

The details of operation S203 illustrated in FIG. 10 will be described. FIG. 11 is a flowchart showing processing procedures performed by the expansion tag processing section 13.

At operation S301, the expansion tag processing section 13 acquires the tenant ID data from the session scope data 18 of a session for processing. Here, the application server 12, the tenant determining section 15, and the expansion tag processing section 13 operate in the same sled. Therefore, it may be configured that the expansion tag processing section 13 is generated in the sled space defined in the application server 12 and the tenant determining section 15 refers to the session scope data 18 including the tenant ID data.

The expansion tag processing section 13 generates the path name of the tenant folder by using the acquired tenant ID data at operation S302. In the above-described embodiment, the path name of the tenant folder data is obtained by adding the tenant ID to the path name of the root folder 171. Therefore, if the tenant ID denotes "AAA", for example, the path name of the tenant-A folder 173 is determined to be "WEB-INF/jsp/AAA".

The expansion tag processing section 13 determines whether the JSP attribute data is specified in the SaaS: include tag data at operation S303. If the jsp attribute data is specified (when the answer is Yes at operation S303), the expansion tag processing section 13 determines what is obtained by adding the jsp-attribute value to the path name of the tenant folder data to be the path name of the screen definition file data for processing at operation S304. More specifically, if the value of the jsp attribute is "aaaaaa. jsp", the path name of the screen definition file data becomes "WEB-INF/jsp/AAA/aaaaaa. jsp".

On the other hand, if no jsp attribute data is specified (when the answer is No at operation S303), the expansion tag processing section n13 determines what is obtained by adding the file name of the include file data which is the current target for processing to the path name of the tenant folder data to be the path name of the screen definition file data for processing at operation S305. More specifically, if the name of the include file data which is the current target for processing is "a. jsp", the path name of the screen definition file data becomes "WEB-INF/jsp/AAA/a. jsp".

After operations S304 and S305, the expansion tag processing section 13 determines whether screen definition file data relating to the generated path name exists at operation S306. If the screen definition file data exists (namely, if screen definition file data customized for a tenant relating to the tenant ID data exists), (when the answer is Yes at operation S306), the expansion tag processing section 13 makes the application server 12 execute the screen definition file data at operation S307. As a result, if screen definition file data stored in the tenant-A folder 173 is executed, for example, screen data customized for the tenant A is generated.

On the other hand, if no screen definition file data relating to the generated path name exist (when the answer is No at operation S306), the expansion tag processing section 13 determines whether the defaultJsp attribute data is specified in the SaaS: include tag data at operation S308. If the defaultJsp attribute data is specified (when the answer is Yes at operation S308), the expansion tag processing section 13 determines what is obtained by adding the value of the defaultJsp attribute data to the path name of the root folder to be the path name of the standard folder 171 of the transition destination screen at operation S309. More specifically, if the value of the defaultJsp attribute data is "default", the path name of the standard folder 171 is determined to be "WEB-INF/jsp/default".

Further, if no defaultJsp attribute data is specified (when the answer is No at operation S308), the expansion tag processing section 13 determines what is obtained by adding a predetermined folder name (common) to the path name of the root folder to be the path name of the standard folder 171 of the transition destination screen at operation S310. Therefore, the path name of the standard folder 171 becomes "WEB-INF/jsp/common".

After operation S308 and S309 are performed, the expansion processing section 13 adds the name of the screen definition file data to the path name of the standard folder 171, and generates the path name of the standard screen definition file data at operation S311. The file name of the screen definition file data, which is added to the path name of the standard folder 171, is determined based on the determinations made at operation S303 to S305. Namely, if the jsp attribute data is specified in the include file data, the value of the jsp attribute data is adopted. Otherwise, the name of the include file data is adopted.

The expansion tag processing section 13 makes the application server 12 execute screen definition file data relating to the generated path name at operation S312. As a result, standard screen data is generated based on the standard screen definition file data.

Thus, according to the above-described embodiment, if there is the screen definition file data uniquely customized for the tenant when a series of screens relating to the screen transitions is generated, the uniquely customized screen definition file data is used. If there is no uniquely customized screen definition file data, the standard screen definition file data (shared among all of the tenants) is used.

For example, if the screen definition file data is generated as illustrated in FIG. 6, the standard screen is displayed as the screen B for the tenant A. For the tenant B, the standard screen is displayed as each of the screens A and C. Since no unique screen definition file data is generated for the tenant C, the standard screen is displayed for each screen.

Therefore, the screen definition file data may not be generated for every screen relating to the screen transitions. In other words, the screen definition file data may be generated for some screens that should be customized. As a result, the number of the screen definition file data items becomes smaller than in the case where the screen definition file data is generated for each screen. Consequently, it becomes possible to reduce the number of man-hours taken for generating the screen definition file data, the amount of storage available for the screen definition file data, and so forth.

In the case of determining the unit of customization not for each tenant, but for each user (the user denotes a single person in the above-described embodiment), the tenant ID is replaced by the user ID data for executing the above-described embodiment. The user ID data may be added to the session scope data 18. Further, the screen definition file data may be generated based on the user ID data. In that case, an example of the client identifier becomes not the tenant ID data, but the user ID data.

Further, data other than the JSP data may be used as the screen definition data. For example, eXtensible Markup Language (XML) data and/or eXtensible Stylesheet Language (XSL) data may be used. Further, Active Server Pages (ASP) data may be used. Different data systems and/or originally defined data may be used.

Further, in the above-described embodiment, a distinction is drawn between the standard screen definition file data and the screen definition file data uniquely determined for each tenant by changing the storage destination folder to another. However, the above-described distinction may be drawn based on the file name. For example, for the screen definition file data uniquely determined for each tenant, the tenant ID data may be included in the file name data. In that case, the standard screen definition file data and the screen definition file data provided for each tenant may be stored in the same folder.

Incidentally, the above-described embodiment allows for reducing the cost to achieve a shift from the existing system where the screen customization for each tenant is performed with difficulty (namely, each tenant is provided with the standard screen) to another system. Screen definition data used in the system where each tenant is provided with the standard screen is usually configured as illustrated in FIG. 12.

Figure 12:
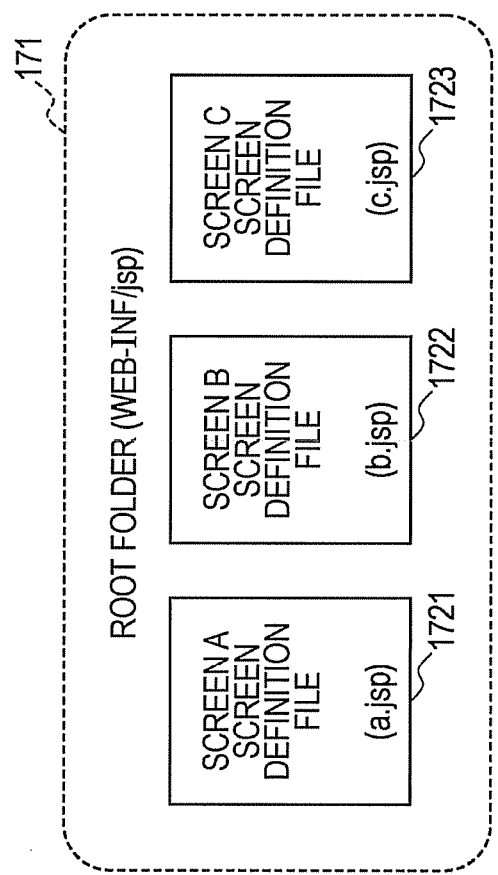
FIG. 12 illustrates an exemplary configuration of screen definition data used in a system providing every tenant with a standard screen.

FIG. 12 illustrates an exemplary configuration of the screen definition data used in the system where each tenant is provided with the standard screen. In FIG. 12, similar features as those illustrated in FIG. 6 are designated by the same reference numerals.

In the system where each tenant is provided with the standard screen as illustrated in FIG. 12, the standard screen definition data items 1711, 1712, and 1713 are retained in the root folder 171. For shifting from the above-described state to that illustrated in FIG. 6, generation of the include file data, shifting the location where the standard screen definition data is stored, generation of screen definition data used for a tenant who desires the customization, and implementation of the expansion tag processing section 13 may be performed. Therefore, the coding of existing programs may not be changed. As a result, it becomes possible to shift to a system that can provide the screen customized for each tenant by performing relatively simple operations.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method executed by a server to provide a service to a plurality of organizations using common application software, the method comprising:
   receiving a service request which contains user information for identifying a user from a client, the user belonging to one of the plurality of organizations;
   identifying the one organization based on the user information and correspondence information describing a correspondence between the user information and the one organization;
   first generating a first response to the service request based on first definition data when the first definition data associated with the one organization is stored in a storage device to which the server is accessible, or second generating a second response to the service request based on second definition data stored in the storage device and not associated with any of the plurality of organizations when the first definition data associated with the one organization is not stored in the storage device, the first definition data defining a unique screen to be provided for the one organization and the second definition data defining a default screen; and
   first transmitting to the client the generated first response or the generated second response, wherein
   the common application software provides a plurality of screens with the client, each of the plurality of screens being provided sequentially to the client in response to each request from the client, and
   the method further comprises:
      receiving a subsequent request from the client after the second response generated by the second generating is transmitted to the client in the first transmitting, the subsequent request being generated based on an operation of the user for the default screen displayed in the client in accordance with the second response;
      determining a subsequent screen subsequent to the default screen based on the subsequent request and the one organization;
      third generating a third response to the subsequent request based on third definition data when the third definition data associated with the one organization is stored in the storage device with respect to the subsequent screen, the third definition data defining a unique screen to be provided for the one organization; and
      second transmitting to the client the generated third response.

2. The method according to claim 1, wherein
the first definition data is stored in a first folder associated with the one organization in the storage device, and
the second definition data is stored in a second folder for the plurality of organizations in the storage device, the second folder being different from the first folder.

3. The method according to claim 1, wherein the service is a Saas (Software as a service).

4. An apparatus to provide a service to a plurality of organizations using common application software, comprising:
   a memory configured to store a program of the common application software; and
   a processor coupled to the memory and configured to execute the program to perform:
      receiving a service request which contains user information for identifying a user from a client belonging to one of the plurality of organizations;
      identifying the one organization based on the user information and correspondence information describing a correspondence between the user information and the one organization;
      first generating a first response to the service request based on first definition data when the first definition data associated with the one organization is stored in a storage device—to which the server is accessible, or second generating a second response to the service request based on second definition data stored in the storage device and not associated with any of the plurality of organizations when the first definition data associated with the one organization is not stored in the storage device, the first definition data defining a unique screen to be provided for the one organization and the second definition data defining a default screen; and
      first transmitting to the client the generated first response or the generated second response, wherein
   the common application software provides a plurality of screens with the client, each of the plurality of screens being provided sequentially to the client in response to each request from the client, and
   the processor is configured to execute the program to perform:
      receiving a subsequent request from the client after the second response generated by the second generating is transmitted to the client in the first transmitting, the subsequent request being generated based on an operation of the user for the default screen displayed in the client in accordance with the second response;
      determining a subsequent screen subsequent to the default screen based on the subsequent request and the one organization;
      third generating a third response to the subsequent request based on third definition data when the third definition data associated with the one organization is stored in the storage device with respect to the subsequent screen, the third definition data defining a unique screen to be provided for the one organization; and
      second transmitting to the client the generated third response.

5. The apparatus according to claim 4, wherein
the first definition data is stored in a first folder associated with the one organization in the storage device, and
the second definition data is stored in a second folder for the plurality of organizations in the storage device, the second folder being different from the first folder.

6. The apparatus according to claim 4, wherein the service is a Saas (Software as a service).

7. A non-transitory computer readable recording medium recording a program to be executed by a processor in a server to perform a process, the program being common application software and the server providing a service to a plurality of organizations using the common application software, the process comprising:
receiving a service request which contains user information for identifying a user from a client, the user belonging to one of the plurality of organizations;
identifying the one organization based on the user information and correspondence information describing a correspondence between the user information and the one organization;
first generating a first response to the service request based on first definition data when the first definition data associated with the one organization is stored in a storage device to which the server is accessible, or second generating a second response to the service request based on second definition data stored in the storage device and not associated with any of the plurality of organizations when the first definition data associated with the one organization is not stored in the storage device, the first definition data defining a unique screen to be provided for the one organization and the second definition data defining a default screen; and
first transmitting to the client the generated first response or the generated second response, wherein
the common application software provides a plurality of screens with the client, each of the plurality of screens being provided sequentially to the client in response to each request from the client, and
the process further comprises:
receiving a subsequent request from the client after the second response generated by the second generating is transmitted to the client in the first transmitting, the subsequent request being generated based on an operation of the user for the default screen displayed in the client in accordance with the second response;
determining a subsequent screen subsequent to the default screen based on the subsequent request and the one organization;
third generating a third response to the subsequent request based on third definition data when the third definition data associated with the one organization is stored in the storage device with respect to the subsequent screen, the third definition data defining a unique screen to be provided for the one organization; and
second transmitting to the client the generated third response.

8. The non-transitory computer readable recording medium according to claim 7, wherein
the first definition data is stored in a first folder associated with the one organization in the storage device, and
the second definition data is stored in a second folder for the plurality of organizations in the storage device, the second folder being different from the first folder.

9. The non-transitory computer readable recording medium according to claim 7, wherein the service is a Saas (Software as a service).

* * * * *